United States

Nakagawa

[11] 3,887,269
[45] June 3, 1975

[54] SUPERTELESCOPIC LENS SYSTEM

[75] Inventor: Jihei Nakagawa, Tokyo, Japan

[73] Assignee: Olympus Opitcal Co., Ltd., Tokyo, Japan

[22] Filed: Oct. 26, 1973

[21] Appl. No.: 410,256

Related U.S. Application Data

[63] Continuation-in-part of Ser. No. 224,720, Feb. 9, 1972, abandoned.

[30] Foreign Application Priority Data

Feb. 10, 1971 Japan.................................. 46-5377

[52] U.S. Cl. ............................................... 350/216
[51] Int. Cl. ....................... G02b 9/60; G02b 13/02
[58] Field of Search .......... 350/214, 215, 216, 220, 350/232

[56] References Cited
UNITED STATES PATENTS

| | | | |
|---|---|---|---|
| 2,730,017 | 1/1956 | Tronnier.............................. | 350/216 |
| 3,388,956 | 6/1968 | Eggert et al. .................... | 350/215 X |
| 3,467,462 | 9/1969 | Kazamaki et al. ............. | 350/216 X |
| 3,524,700 | 8/1970 | Eggert et al. .................... | 350/216 X |

*Primary Examiner*—John K. Corbin
*Attorney, Agent, or Firm*—Waters, Schwartz & Nissen

[57] ABSTRACT

A supertelescopic lens system has front and rear groups of lenses spaced apart one from the other by a large air space. The front group of the lens system comprises a positive single first lens, negative single second lens and positive single third lens while the rear group of the lens system comprises a positive single fourth lens and negative single fifth lens. The whole lens system is designed to satisfy the following four conditions 1. $0.45F < f_{123} < 0.6f$,
2. $n_2 > 1.7$ and $n_3 > 1.7$,
3. $0.1f < r_7 < 0.4f$ and $0.1f < r_{10} < 0.4f$, and 4. $0.45f < f_4 < 0.6f$ where
 $f$ is the composite focal length of the whole lens system,
 $f_{123}$ the composite focal length of the front group of the lens system,
 $f_4$ the focal length of the fourth lens, and
 $r_i$, $d_i$ and $n_i$ ($i=1, 2, 3, \ldots$) the radii of curvatures of respective lenses, axial thicknesses of the respective lenses or air spaces between adjacent lenses and refractive indexes of the respective lenses, respectively.

5 Claims, 13 Drawing Figures

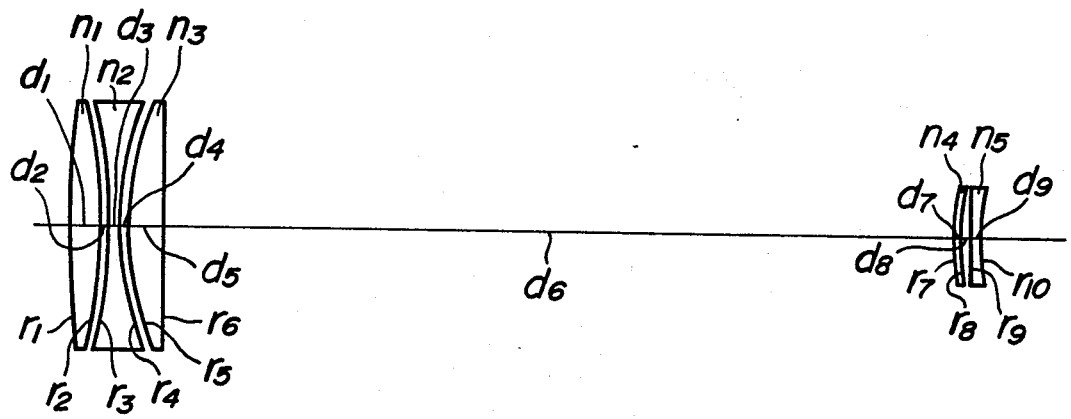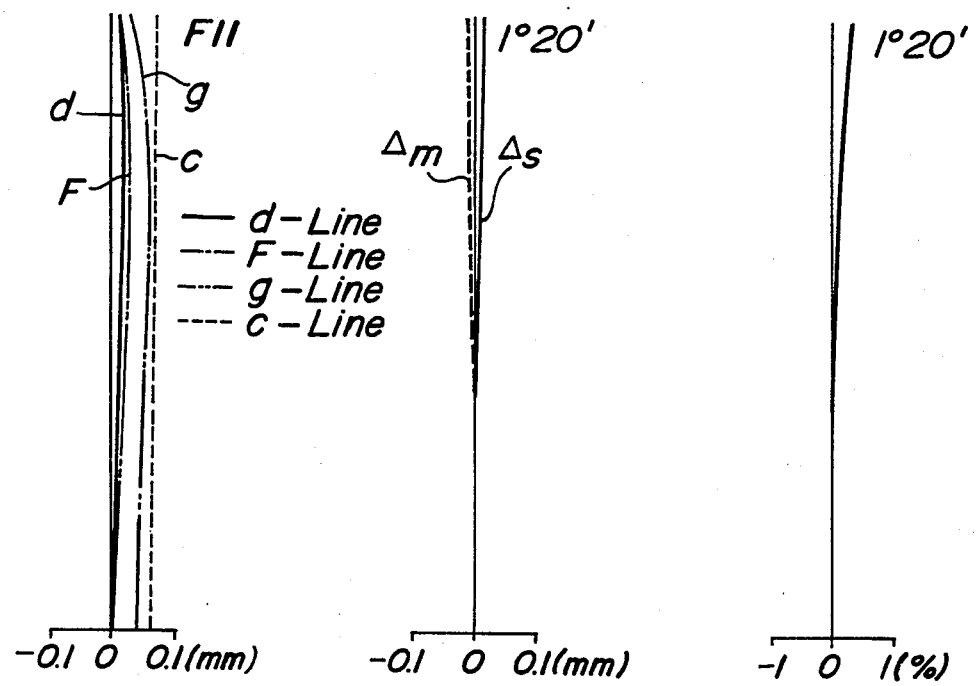

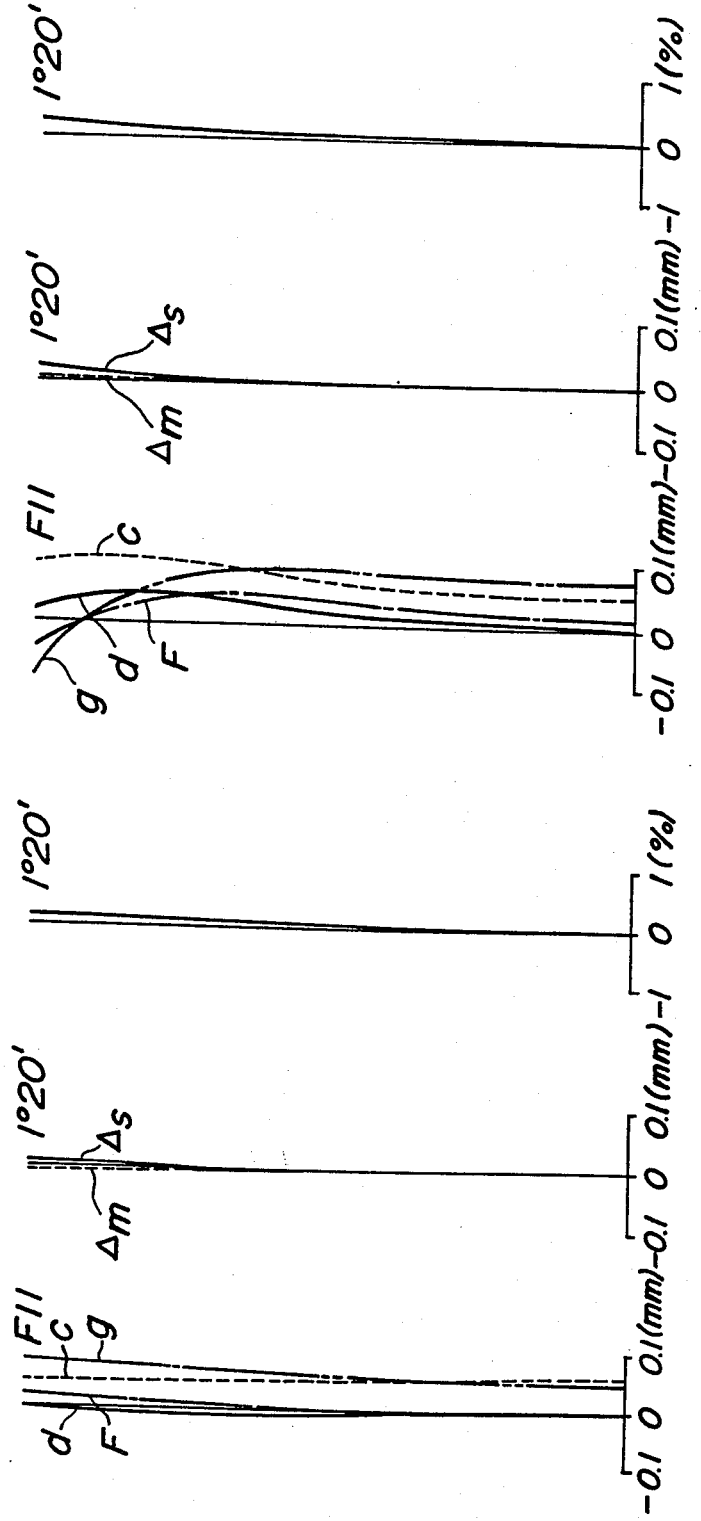

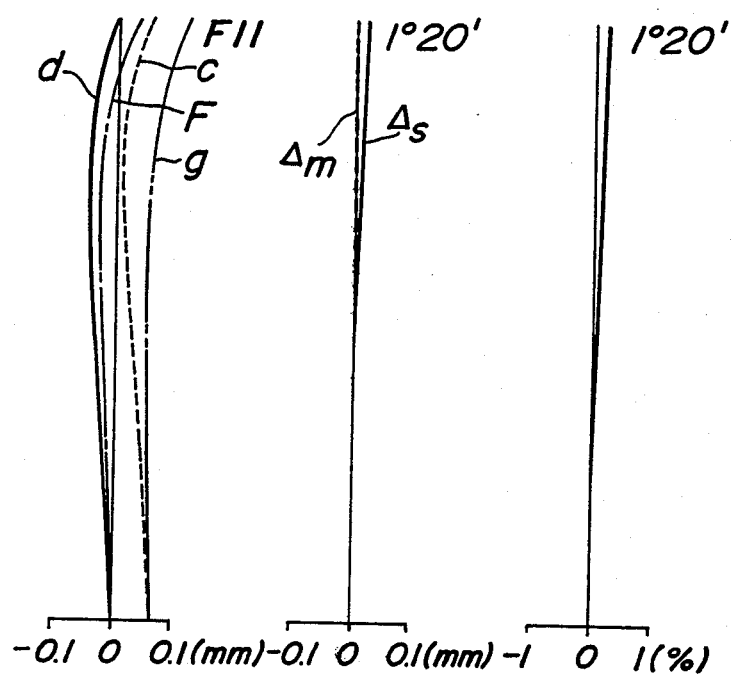

SUPERTELESCOPIC LENS SYSTEM

This is a continuation-in-part of application Ser. No. 224,720, filed Feb. 9, 1972, now abandoned.

This invention relates to a supertelescopic lens system comprising five lenses.

An image given by a supertelescopic lens system is mainly degraded by the chromatic aberration thereof. However, a decrease of the chromatic aberration causes an increase of the telephoto ratio which is defined by $l/f$ where $l$ is the distance between the front face of the first group of lenses and the photosensitive film and $f$ is the composite focal length of the whole lens system. The increase of the telephoto ratio is not desirable since then $f$ becomes short.

Heretofore, it has been the common practice to use a special and expensive material such as fluorspar or the like for the purpose of decreasing the telephoto ratio or to adopt a relatively large telephoto ratio in the order of 0.8.

An object of the invention is to provide a supertelescopic lens system having a relatively small telephoto ratio in the order of 0.7 and excellent optical properties without requiring the use of such special and expensive material as fluorspar or the like.

This and other desirable objects are attained, according to this invention, by a supertelescopic lens system comprising a positive single first lens, a negative single second lens, a positive single third lens, said first, second and third lenses forming a front group of the lens system, a positive single fourth lens, and a negative single fifth lens, said fourth and fifth lenses being separated from said front group of the lens system by a large air space, and the whole lens system being such that the four conditions:

1. $0.45f < f_{123} < 0.6f$,
2. $n_2 > 1.7$ and $n_3 > 1.7$,
3. $0.1f < r_7 < 0.4f$ and $0.1f < r_{10} < 0.4f$, and
4. $0.45f < f_4 < 0.6f$ are satisfied where $f$ is the composite focal length of the whole lens system, $f_{123}$ the composite focal length of the front group of the lens system, $f_4$ the focal length of the fourth lens, and $r_i$, $d_i$ and $n_i$ ($i=1, 2, 3, ...$) the radii of curvatures of respective lenses, axial thicknesses of the respective lenses or air space between adjacent lenses and refractive indexes of the respective lenses, respectively.

In the supertelescopic lens according to the invention, the front group of the lens system consisting of the first, second and third lenses are made of lens materials so selected on the basis of the superachromatic theory that the composite focal length of the front group of the lens system consisting of the first, second and third lenses $f_{123}$ is given by $0.45f < f_{123} < 0.6f$ and the refractive indexes of the second and third lenses $n_2$ and $n_3$ are given by $n_2 > 1.7$ and $n_3 > 1.7$, respectively. Moreover, the convex principal surfaces of the rear group of the lens system consisting of the fourth and fifth lenses are directed to the object to be observed, that is, the radii of curvature thereof $r_7$ and $r_{10}$ are given by $0.1f < r_7 < 0.4f$ and $0.1f < r_{10} < 0.4f$, respectively, contrary to the conventional telescopic lens system wherein the concave principal surfaces of these lenses are directed to the object to be observed. This feature together with the final condition that the focal length of the fourth lens $f_4$ is given by $0.4f < f_4 < 0.7f$ makes it possible to remarkably improve the aberrations inclusive of spherical aberration, astigmatism and distortion all over the sight field. Thus, the invention is capable of providing a supertelescopic lens system having a relatively small telephoto ratio in the order of 0.7.

The reasons why the condition (1) that $0.45f < f_{123} < 0.6f$ must be satisfied are due to the fact that even if the composite focal length of the front group of lenses $f_{123}$ shorter than $0.45f$ causes the telephoto ratio to decrease, the magnification of the rear group of lens system becomes large and hence the radii of curvatures of lens surfaces thereof become small, and as a result, particularly the spherical and chromatic aberrations are so degraded that it becomes difficult to correct these aberrations, and that the composite focal length of the front group of lenses $f_{123}$ longer than $0.6f$ makes it difficult to decrease the telephoto ratio to the order of 0.7.

In addition, the condition (1) can theoretically be explained as follows.

Let $f$ = the composite focal length of the whole lens system,
$f_1$ = the composite focal length of the front group of the lens system ($f_{123}$),
$M$ = the magnification of the rear group of the lens system,
$T$ = the telephoto ratio,
$l$ = the air space between the front and rear groups of the lens system, and
$f_2$ = the composite focal length of the rear group of the lens system.

Then $$f = f_1 M \quad (1)$$
$$T = \frac{l(1-M)+f}{f} \quad (2)$$
$$f_2 = \frac{M}{1-M}(f_1-l) \quad (3)$$

If $T$ is made small, the absolute value of $f_1$ and $f_2$ becomes small, and, as a result, the negative value of the Petzval sum is excessively decreased and the positive distortion is increased. Thus, it is preferable to make $|f_2|$ maximum.

From the calculation treaties of the above equations (1), (2) and (3), the following relations can be obtained.

$$f_1 = \frac{fT}{2-T}, \quad f_2 = \frac{M}{1-M}(f_1-l),$$
$$l = \frac{(T-1)}{1-M}f, \quad M = \frac{f}{f_1}.$$

In the above relations, let $T = 0.75$, then $f_1 = 0.6f$ and let $T = 0.62$, then $f_1 = 0.45f$. That is, the condition (1) that $0.45f < f_{123} < 0.6f$ can maintain the telephoto ratio within the range of 0.62 to 0.75.

The reasons why the condition (2) that $n_2 > 1.7$ and $n_3 > 1.7$ must be satisfied are due to the fact if the refractive indexes of the second and third lenses $n_2$ and $n_3$ are less than 1.7, respectively, the radii of curvature of these lenses become small and hence the spherical aberrations become so large that division of the lenses or other means must be used for the purpose of correcting these aberrations.

The reasons why the condition (3) that $r_7, r_{10} < 0.4f$ must be satisfied are due to the fact that if $r_7, r_{10} > 0.4f$, then distortion and curvature of the image plane become increased so that it is possible to make the sagittal aberrations extremely small. In general, the distortion and curvature of the image plane can significantly be corrected by the arrangement in which the concave surfaces of the lenses separated by a diaphragm space are turned toward the diaphragm. In the present invention, such conventional arrangement is reversed and the convex surfaces of these lenses are turned toward the diaphragm and the sagittal aberration is taken into consideration by defining the condition (3) $0.1f < r_7 < 0.4f$ and $0.1f < r_{10} < 0.4f$.

This condition (3) has the feature that the distortion and curvature of the plane are not so much degraded even though the above reverse arrangement is adopted.

The reasons why the condition (4) that $0.45f < f_4 < 0.6f$ must be satisfied are due to the fact that if $f_4 < 0.45f$ the negative refractive power of the fifth lens becomes stronger thus degrading the spherical aberration, coma, etc., and that if $f_4 > 0.6f$ the refractive power of the fourth lens becomes insufficient to correct the coma.

The invention and the advantages thereof will be more clearly understood from the following detailed description when taken in conjunction with the accompanying drawings, wherein:

FIG. 1 is a schematic sectional view of an embodiment of a supertelescopic lens system according to the invention;

FIGS. 2-A to 5-A show spherical aberration curves corrected by four embodiments of the lens system shown in FIG. 1; and FIGS. 2-B to 5-B and 2-C to 5-C show astigmatism and distortion curves corrected by four embodiments of the lens system shown in FIG. 1, respectively.

Referring now to FIG. 1, there is shown a schematic section of a supertelescopic lens system according to the invention. The supertelescopic lens system shown in FIG. 1 comprises a first lens constituting a positive single lens whose radii of curvatures, axial thickness and refractive index are denoted by $r_1, r_2, d_1$ and $n_1$, respectively, a second lens constituting a negative single lens whose radii of curvatures, axial thickness and refractive index are denoted by $r_3, r_4, d_3$ and $n_2$, respectively, and a third lens constituting a positive single lens whose radii of curvatures, axial thickness and refractive index are denoted by $r_5, r_6, d_5$ and $n_3$, respectively. $d_2$ designates the air space between the first and second lenses and $d_4$ designates the air space between the second and third lenses. The first, second and third lenses form a front group of the lens system.

The supertelescopic lens system shown in FIG. 1 further comprises a fourth lens constituting a positive single lens and a fifth lens constituting a negative single lens. These fourth and fifth lenses are separated from the front group of the lens system by a large air space $d_6$. These fourth and fifth lenses form a rear group of the lens system and the convex principal surfaces of the rear group of the lens system are directed to the object to be observed (not shown) as shown in FIG. 1. The radii of curvatures, axial thickness and refractive index of the fourth lens are denoted by $r_7, r_8, d_7$ and $n_4$, respectively, and those of the fifth lens are denoted by $r_9, r_{10}, d_9$ and $n_5$, respectively. $d_8$ designates the air space between the fourth and fifth lenses.

Now, the invention will be described with reference to numerical examples.

Example 1

$f=100$ mm $\quad f_H=32.58$ mm $\quad F=1:11$
$f_{123}=51.6$ mm $\quad f_4=53.8$ mm
Telephoto ratio = 0.702

| $r_i$ | $d_i$ | $n_i$ | $v_i$ |
|---|---|---|---|
| $r_1= 38.079$ | | | |
| | $d_1= 1.351$ | $n_1=1.618$ | $v_1=63.38$ |
| $r_2= -22.975$ | | | |
| | $d_2= 0.014$ | | |
| $r_3= -23.811$ | | | |
| | $d_3= 0.8$ | $n_2=1.7552$ | $v_2=27.5$ |
| $r_4= 12.937$ | | | |
| | $d_4= 0.209$ | | |
| $r_5= 13.323$ | | | |
| | $d_5= 1.325$ | $n_3=1.7817$ | $v_3=25.6$ |
| $r_6= -113.167$ | | | |
| | $d_6= 33.162$ | | |
| $r_7= 23.928$ | | | |
| | $d_7= 0.299$ | $n_4=1.6990$ | $v_4=30.1$ |
| $r_8= 65.522$ | | | |
| | $d_8= 0.05$ | | |
| $r_9= \infty$ | | | |
| | $d_9= 0.37$ | $n_5=1.5687$ | $v_5=63.1$ |
| $r_{10}= 11.799$ | | | |

In the above Table
$f$ . . . Composite focal length of the whole lens system,
$f_B$ . . . Back focus of the whole lens system,
$F$ . . . Aperture of the whole lens system,
$r_i$ . . . Radii of curvatures of respective lenses,
$d_i$ . . . Axial thicknesses of respective lenses or air spacings between adjacent lenses,
$n_i$ . . . Refractive indexes of the respective lenses,
$v_i$ . . . Abbe's numbers of the respective lenses.

Example 2

$f=100$ mm $\quad f_H=36.234$ mm $\quad F=1:11$
$f_{123}=54.890$ mm $\quad f_4=59.975$ mm
Telephoto ratio = 0.74

| $r_i$ | $d_i$ | $n_i$ | $v_i$ |
|---|---|---|---|
| $r_1= 39.491$ | | | |
| | $d_1= 1.355$ | $n_1=1.618$ | $v_1=63.4$ |
| $r_2= -25.376$ | | | |
| | $d_2= 0.014$ | | |
| $r_3= -26.246$ | | | |
| | $d_3= 0.802$ | $n_2=1.7552$ | $v_2=27.5$ |
| $r_4= 14.142$ | | | |
| | $d_4= 0.209$ | | |
| $r_5= 14.538$ | | | |
| | $d_5= 1.329$ | $n_3=1.78472$ | $v_3=25.7$ |
| $r_6= -130.738$ | | | |
| | $d_6= 33.257$ | | |
| $r_7= 25.934$ | | | |
| | $d_7= 0.300$ | $n_4=1.69895$ | $v_4=30.1$ |
| $r_8= 67.692$ | | | |
| | $d_8= 0.050$ | | |
| $r_9= -148.780$ | | | |
| | $d_9= 0.371$ | $n_5=1.56873$ | $v_5=63.2$ |
| $r_{10}= 12.956$ | | | |

Example 3

$f=100$ mm $\quad f_H=33.717$ mm $\quad F=1:11$
$f_{123}=48.934$ mm $\quad f_4=54.823$ mm
Telephoto ratio = 0.69

| $r_i$ | $d_i$ | $n_i$ | $v_i$ |
|---|---|---|---|
| $r_1= 37.419$ | | | |
| | $d_1= 1.394$ | $n_1=1.618$ | $v_1=63.4$ |
| $r_2= -21.108$ | | | |
| | $d_2= 0.014$ | | |
| $r_3= -22.018$ | | | |
| | $d_3= 0.797$ | $n_2=1.7552$ | $v_2=27.5$ |
| $r_4= 11.597$ | | | |
| | $d_4= 0.211$ | | |
| $r_5= 11.988$ | | | |
| | $d_5= 1.394$ | $n_3=1.78472$ | $v_3=25.7$ |
| $r_6= -98.791$ | | | |
| | $d_6= 30.867$ | | |

Example 3-Continued $f=100$ mm  $f_B=33.717$ mm  $F=1:11$
$f_{123}=48.934$ mm  $f_4=54.823$ mm
Telephoto ratio = 0.69

| $r_i$ | $d_i$ | $n_i$ | $v_i$ |
|---|---|---|---|
| $r_7= 24.956$ | | | |
| | $d_7= 0.298$ | $n_4=1.69895$ | $v_4=30.1$ |
| $r_8= 71.212$ | | | |
| | $d_8= 0.050$ | | |
| $r_9= \infty$ | | | |
| | $d_9= 0.368$ | $n_5=1.56873$ | $v_5=63.2$ |
| $r_{10}= 11.373$ | | | |

Example 4

$f=100$ mm  $f_B=30.948$ mm  $F=1:11$
$f_{123}=51.217$ mm  $f_4=47.798$ mm
Telephoto ratio = 0.684

| $r_i$ | $d_i$ | $n_i$ | $v_i$ |
|---|---|---|---|
| $r_1= 22.793$ | | | |
| | $d_1= 1.348$ | $n_1=1.618$ | $v_1=63.4$ |
| $r_2= -28.476$ | | | |
| | $d_2= 0.014$ | | |
| $r_3= -31.393$ | | | |
| | $d_3= 0.798$ | $n_2=1.7552$ | $v_2=27.5$ |
| $r_4= 12.335$ | | | |
| | $d_4= 0.208$ | | |
| $r_5= 12.779$ | | | |
| | $d_5= 1.322$ | $n_3=1.78472$ | $v_3=25.7$ |
| $r_6= -1793.165$ | | | |
| | $d_6= 33.089$ | | |
| $r_7= 20.655$ | | | |
| | $d_7= 0.298$ | $n_4=1.69895$ | $v_4=30.1$ |
| $r_8= 53.785$ | | | |
| | $d_8= 0.050$ | | |
| $r_9= -244.823$ | | | |
| | $d_9= 0.369$ | $n_5=1.56873$ | $v_5=63.2$ |
| $r_{10}= 11.299$ | | | |

In FIGS. 2-A to 5-A showing spherical aberration curves corrected by the four embodiments of the lens system shown in FIG. 1, the full line curve is the $d$-line, the dot-dash lines curve the F-line, the two dots-dash lines curve the $g$-line and the dotted lines curve the $c$-line.

In FIGS. 2-B to 5-B showing an astigmatism curves corrected by the four embodiments of the lens system shown in FIG. 1, $\Delta$s designates the sagittal astigmatism curve and $\Delta$m the meridional astigmatism curve.

FIGS. 2-C to 5-C show distortion curves corrected by the four embodiments of the lens system shown in FIG. 1.

As seen from FIGS. 2-A to 5-A, 2-B to 5-B and 2-C to 5-C showing respective aberration curves of the supertelescopic lens system embodying the invention, each of these aberrations is significantly corrected to the degree expected by the use of the special and expensive material such as fluorspar, etc.

From examples 1–4, it is seen that $r_7$ lies within the range of about 0.20 and 0.26F and $r_{10}$ lies within the range of about 0.11 and 0.13$f$.

What is claimed is:

1. A supertelescopic lens system comprising a positive single first lens, a negative single second lens, a positive single third lens, said first, second and third lenses forming a front group of the lens system, a positive single fourth lens, and a negative single fifth lens, said fourth and fifth lenses being separated from said front group of the lens system by a large air space, and the whole lens system being such that the four conditions 1. $0.45f < f_{123} < 0.6f$,
2. $n_2 > 1.7$ and $n_3 > 1.7$,
3. $0.20f < r_7 < 0.26f$ and $0.11f < r_{10} < 0.13f$, and
4. $0.45f < f_4 < 0.6f$ are satisfied where $f$ is the composite focal length of the whole lens system, $f_{123}$ the composite focal length of the front group of the lens system, $f_4$ the focal length of the fourth lens, and $r_i$, $d_i$ and $n_i$ ($i=1, 2, 3, ...$) the radii of curvature of respective lenses, axial thicknesses of the respective lenses or air spaces between adjacent lenses and refractive indexes of the respective lenses.

2. A supertelescopic lens system comprising a positive single first lens, a negative single second lens, a positive single third lens, said first, second and third lenses forming a front group of the lens system, a positive single fourth lens, and a negative single fifth lens, said fourth and fifth lenses being separated from said front group of the lens system by a large air space, and the whole lens system being such that the four conditions 1. $0.45f < f_{123} < 0.6f$,
2. $n_2 > 1.7$ and $n_3 > 1.7$,
3. $0.1f < r_7 < 0.4f$ and $0.1f < r_{10} < 0.4f$, and
4. $0.45f < f_4 < 0.6f$ are satisfied where $f$ is the composite focal length of the whole lens system, $f_{123}$ the composite focal length of the front group of the lens system, $f_4$ the focal length of the fourth lens, and $r_i$, $d_i$ and $n_i$ ($i=1, 2, 3, ...$) the radii of curvature of respective lenses, axial thicknesses of the respective lenses or air spaces between adjacent lenses and refractive indexes of the respective lenses, wherein $f=100$ mm, $f_B$ is 32.58 mm and F is $1:11$, $f_{123}=51.6$ mm, $f_4=53.8$ mm and telephoto ratio is 0.702, and $r_i$, $d_i$, $n_i$ and $v_i$ (Abbe's numbers) are defined by the following values:

| $r_i$ | $d_i$ | $n_i$ | $v_i$ |
|---|---|---|---|
| $r_1 = 38.079$ | | | |
| | $d_1= 1.351$ | $n_1=1.618$ | $v_1=63.38$ |
| $r_2 = -22.975$ | | | |
| | $d_2= 0.014$ | | |
| $r_3 = -23.811$ | | | |
| | $d_3= 0.8$ | $n_2=1.7552$ | $v_2=27.5$ |
| $r_4 = 12.937$ | | | |
| | $d_4= 0.209$ | | |
| $r_5 = 13.323$ | | | |
| | $d_5= 1.325$ | $n_3=1.7817$ | $v_3=25.6$ |
| $r_6 = -113.167$ | | | |
| | $d_6=33.162$ | | |
| $r_7 = 23.928$ | | | |
| | $d_7= 0.299$ | $n_4=1.6990$ | $v_4=30.1$ |
| $r_8 = 65.522$ | | | |
| | $d_8= 0.05$ | | |
| $r_9 = \infty$ | | | |
| | $d_9= 0.37$ | $n_5=1.5687$ | $v_5=63.1$ |
| $r_{10}= 11.799$ | | | |

3. A supertelescopic lens system comprising a positive single first lens, a negative single second lens, a positive single third lens, said first, second and third lenses forming a front group of the lens system, a positive single fourth lens, and a negative single fifth lens, said fourth and fifth lenses being separated from said front group of the lens system by a large air space, and the whole lens system being such that the four conditions 1. $0.45f < f_{123} < 0.6f$,
2. $n_2 > 1.7$ and $n_3 > 1.7$,
3. $0.1f < r_7 < 0.4f$ and $0.1f < r_{10} < 0.4f$, and
4. $0.45f < f_4 < 0.6f$ are satisfied where $f$ is the composite focal length of the whole lens system, $f_{123}$ the composite focal length of front group of the lens system, $f_4$ the focal length of the fourth lens, and $r_i$, $d_i$ and $n_i$ ($i=1, 2, 3, ...$) the radii of curvature of respective lenses, axial thicknesses of the respective lenses or air spaces between adjacent lenses and refractive indexes of the respective lenses, wherein $f=100$ mm, $f_B$ is 36.234 mm, F is 1:11, $f_{123}$ is 54.890 mm, $f_4$ is 59.975 mm and telephoto ratio is 0.74 and $r_i$, $d_i$, $n_i$ and $v_i$ (Abbe's numbers) are defined by the following values:

| $r_i$ | $d_i$ | $n_i$ | $v_i$ |
|---|---|---|---|
| $r_1 = 39.491$ | | | |
| | $d_1 = 1.355$ | $n_1 = 1.618$ | $v_1 = 63.4$ |
| $r_2 = -25.376$ | | | |
| | $d_2 = 0.014$ | | |
| $r_3 = -26.246$ | | | |
| | $d_3 = 0.802$ | $n_2 = 1.7552$ | $v_2 = 27.5$ |
| $r_4 = 14.142$ | | | |
| | $d_4 = 0.209$ | | |
| $r_5 = 14.538$ | | | |
| | $d_5 = 1.329$ | $n_3 = 1.78472$ | $v_3 = 25.7$ |
| $r_6 = -130.738$ | | | |
| | $d_6 = 33.257$ | | |
| $r_7 = 25.934$ | | | |
| | $d_7 = 0.300$ | $n_4 = 1.69895$ | $v_4 = 30.1$ |
| $r_8 = 67.692$ | | | |
| | $d_8 = 0.050$ | | |
| $r_9 = -148.780$ | | | |
| | $d_9 = 0.371$ | $n_5 = 1.56873$ | $v_5 = 63.2$ |
| $r_{10} = 12.956$. | | | |

4. A supertelescopic lens system comprising a positive single first lens, a negative single second lens, a positive single third lens, said first, second and third lenses forming a front group of the lens system, a positive single fourth lens, and a negative single fifth lens, said fourth and fifth lenses being separated from said front group of the lens system by a large air space, and the whole lens system being such that the four conditions 1. $0.45f < f_{123} < 0.6f$,
2. $n_2 > 1.7$ and $n_3 > 1.7$,
3. $0.1f < r_7 < 0.4f$ and $0.1f < r_{10} < 0.4f$, and
4. $0.45f < f_4 < 0.6f$ are satisfied where $f$ is the composite focal length of the whole lens system, $f_{123}$ the composite focal length of the front group of the lens system, $f_4$ the focal length of the fourth lens, and $r_i$, $d_i$ and $n_i$ ($i=1, 2, 3, ...$) the radii of curvature of respective lenses, axial thicknesses of the respective lenses or air spaces between adjacent lenses and refractive indexes of the respective lenses, wherein $f=100$ mm, $f_B$ is 33.717 mm, F is 1:11, $f_{123}$ is 48.934 mm, $f_4$ is 54.823 mm and telephoto ratio is 0.69 and $r_i$, $d_i$, $n_i$ and $v_i$ (Abbe's numbers) are defined by the following values:

| $r_i$ | $d_i$ | $n_i$ | $v_i$ |
|---|---|---|---|
| $r_1 = 37.419$ | | | |
| | $d_1 = 1.394$ | $n_1 = 1.618$ | $v_1 = 63.4$ |
| $r_2 = -21.108$ | | | |
| | $d_2 = 0.014$ | | |
| $r_3 = -22.018$ | | | |
| $r_4 = 11.597$ | $d_3 = 0.797$ | $n_2 = 1.7552$ | $v_2 = 27.5$ |
| | $d_4 = 0.211$ | | |
| $r_5 = 11.988$ | | | |
| | $d_5 = 1.394$ | $n_3 = 1.78472$ | $v_3 = 25.7$ |
| $r_6 = -98.791$ | | | |
| | $d_6 = 30.867$ | | |
| $r_7 = 24.956$ | | | |
| | $d_7 = 0.298$ | $n_4 = 1.69895$ | $v_4 = 30.1$ |
| $r_8 = 71.212$ | | | |
| | $d_8 = 0.050$ | | |
| $r_9 = \infty$ | | | |
| | $d_9 = 0.368$ | $n_5 = 1.56873$ | $v_5 = 63.2$ |
| $r_{10} = 11.373$. | | | |

5. A supertelescopic lens system comprising a positive single first lens, a negative single second lens, a positive single third lens, said first, second and third lenses forming a front group of the lens system, a positive single fourth lens, and a negative single fifth lens, said fourth and fifth lenses being separated from said front group of the lens system by a large air space, and the whole lens system being such that the four conditions 1. $0.45f < f_{123} < 0.6f$,
2. $n_2 > 1.7$ and $n_3 > 1.7$,
3. $0.1f < r_7 < 0.4f$ and $0.1f < r_{10} < 0.4f$, and
4. $0.45f < f_4 < 0.6f$ are satisfied where $f$ is the composite focal length of the whole lens system, $f_{123}$ the composite focal length of the front group of the lens system, $f_4$ the focal length of the fourth lens, and $r_i$, $d_i$ and $n_i$ ($i=1, 2, 3, ...$) the radii of curvature of respective lenses, axial thicknesses of the respective lenses or air spaces between adjacent lenses and refractive indexes of the respective lenses, wherein $f=100$ mm $f_B=30.948$, F is 1:11, $f_{123}$ is 51.217 mm, $f_4$ is 47.798 mm and telephoto ratio is 0.684 and $r_i$, $d_i$, $n_i$ and $v_i$ (Abbe's numbers) are defined by the following values:

| $r_i$ | $d_i$ | $n_i$ | $v_i$ |
|---|---|---|---|
| $r_1 = 22.793$ | | | |
| | $d_1 = 1.348$ | $n_1 = 1.618$ | $v_1 = 63.4$ |
| $r_2 = -28.476$ | | | |
| | $d_2 = 0.014$ | | |
| $r_3 = -31.393$ | | | |
| | $d_3 = 0.798$ | $n_2 = 1.7552$ | $v_2 = 27.5$ |
| $r_4 = 12.335$ | | | |
| | $d_4 = 0.208$ | | |
| $r_5 = 12.779$ | | | |
| | $d_5 = 1.322$ | $n_3 = 1.78472$ | $v_3 = 25.7$ |
| $r_6 = -1793.165$ | | | |
| | $d_6 = 33.089$ | | |
| $r_7 = 20.655$ | | | |
| | $d_7 = 0.298$ | $n_4 = 1.69895$ | $v_4 = 30.1$ |
| $r_8 = 53.785$ | | | |
| | $d_8 = 0.050$ | | |
| $r_9 = 244.823$ | 244.823 | | |
| | $d_9 = 0.369$ | $n_5 = 1.56873$ | $v_5 = 63.2$ |
| $r_{10} = 11.299$. | | | |

\* \* \* \* \*